US005579716A

United States Patent [19]
Groff

[11] Patent Number: 5,579,716
[45] Date of Patent: Dec. 3, 1996

[54] DEVICE FOR INDICATING THE POSITION OF A TRACTOR WITH RESPECT TO A CROP ROW OR PLANTER MARK

[76] Inventor: Jerry L. Groff, 1320 Wellington, Imperial, Nebr. 69033

[21] Appl. No.: 489,342

[22] Filed: Jun. 12, 1995

[51] Int. Cl.⁶ .............................. G01C 7/02; A01B 69/00
[52] U.S. Cl. ..................... 116/28 R; 116/303; 33/286; 33/624; 33/645; 172/430
[58] Field of Search .................... 116/28 R, 56, 116/62.4, DIG. 13, 303, 28 A, 31, 284, 285; 33/1 H, 286, 264, 521, 533, 624, 645; 172/430; 180/401

[56] References Cited

U.S. PATENT DOCUMENTS

| 1,166,680 | 1/1916 | Hanson | 116/31 |
|---|---|---|---|
| 1,545,233 | 7/1925 | Caldwell | 116/31 |
| 2,538,112 | 1/1951 | Maier | 172/430 |
| 2,945,470 | 7/1960 | Kolbe | 116/303 |
| 3,392,697 | 7/1968 | Parrish et al. | 116/303 |
| 3,402,784 | 9/1968 | Roberson et al. | 180/401 |
| 3,857,455 | 12/1974 | Ernst | 180/401 |
| 4,414,903 | 11/1983 | Fasse et al. | 180/401 |

Primary Examiner—William A. Cuchlinski, Jr.
Assistant Examiner—Andrew Hirshfeld
Attorney, Agent, or Firm—Zarley, McKee, Thomte, Voorhees & Sease; Dennis L. Thomte

[57] ABSTRACT

A device for indicating the relative position of a tractor with respect to a crop row or planter mark including a vertically disposed, hollow support post secured to the forward end of the tractor at the centerline thereof. A rotatable shaft is mounted in the support post and has an upper end positioned above the support post and a lower end positioned below the lower end of the support post. A linkage is connected to the lower end of the shaft and has a follower positioned rearwardly thereof which follows the crop row or planter mark. An indicator is secured to the upper end of the shaft for movement therewith. As the tractor drifts laterally with respect to the crop row or planter mark, the indicator moves indicating to the tractor operator that the tractor must be steered back into alignment with the crop row or planter mark.

8 Claims, 6 Drawing Sheets

5,579,716

1

DEVICE FOR INDICATING THE POSITION OF A TRACTOR WITH RESPECT TO A CROP ROW OR PLANTER MARK

BACKGROUND OF THE INVENTION

1. Field of the Invention

This invention relates to a device for indicating the position of a tractor with respect to a crop row or planter row and more particularly relates to an indicator or pointer which is designed to assist the tractor drivers steering of the tractor by guiding the driver directly down the center of the crop row or the planter mark. The driver manually corrects the steering of the tractor for directional deviations as indicated by deflections in a mechanically linked pointer positioned in front of the centerline of the tractor hood.

2. Description of the Related Art

Farming operations such as cultivation operations require accurate positioning of the tractor during the operation so as to properly cultivate the ground without damaging the seed beds or planted rows in the field. Many types of electrical sensing devices have been previously provided for laterally shifting a tool bar or the like so that the cultivator or the like remains in a proper alignment with the crop rows. However, such elaborate electrical systems are extremely expensive and obviously have limitations as to the amount of lateral movement which the tool bar can make to adjust for deviations in the positions of the tractor. For example, see U.S. Pat. No. 4,930,581 issued Jun. 5, 1990. A guidance system which is believed to be very similar, if not identical, to that disclosed in U.S. Pat. No. 4,930,581 is manufactured by Fleischer Manufacturing, Inc. of Columbus, Nebr., under the trademark BUFFALO SCOUT. Yet another type of guidance system is manufactured by Lincoln Creek Manufacturing Co., Inc. of Phillips, Nebr., under the trademark THE GUIDE. Yet another type of guidance control is manufactured by Sunco Marketing of North Platte, Nebr., under the trademark ACURA TRAK.

Yet another disadvantage of the prior art systems of which applicant is aware is that the operator must constantly look to the rear to see if the cultivator is being properly positioned by the guidance control, thereby increasing the strain on the operator which may result in crop damage.

BREIF DESCRIPTION OF THE DRAWINGS

2

SUMMARY OF THE INVENTION

Figure 1:
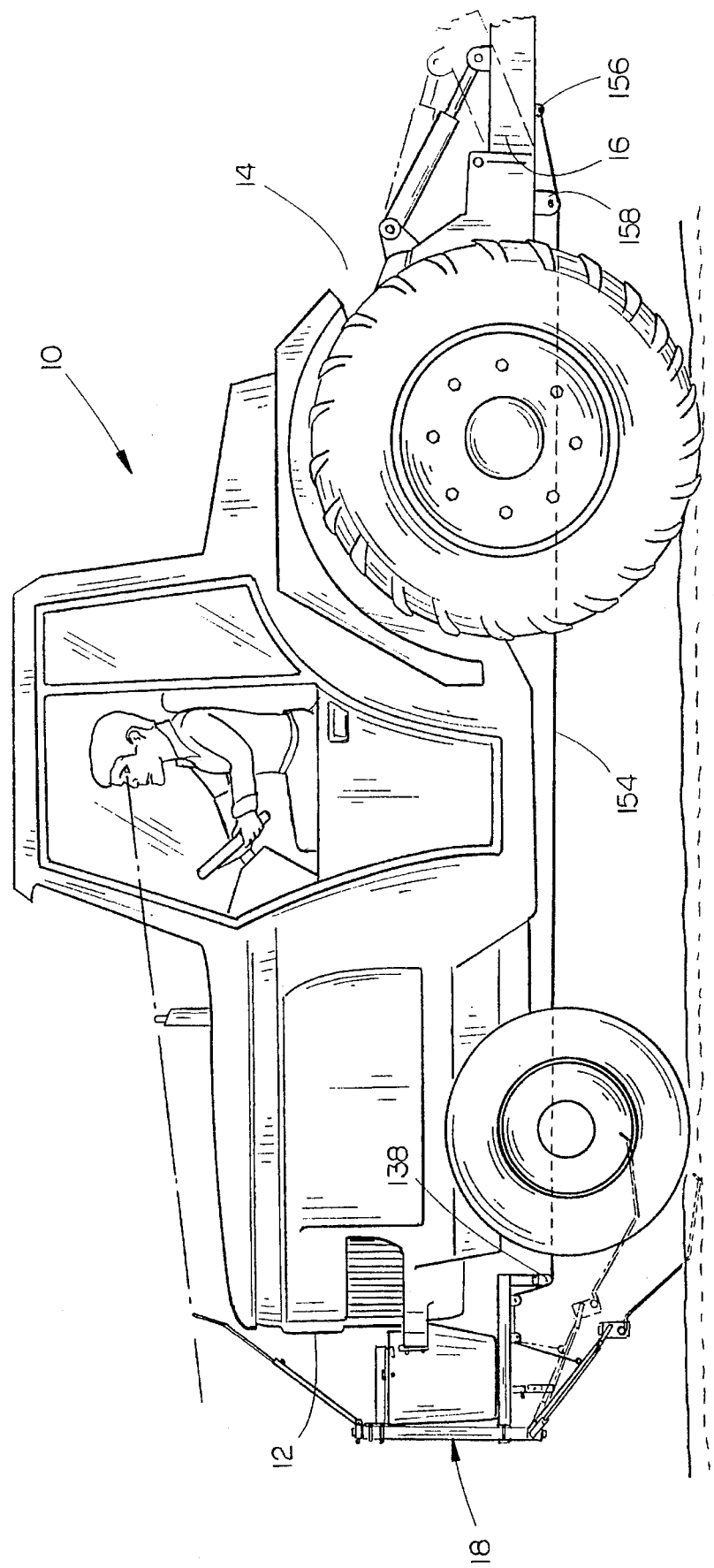
FIG. 1 is a side view of a conventional tractor having the device of this invention mounted thereon.

A device for indicating the relative position of a tractor with respect to a crop row or planter mark is disclosed comprising a vertically disposed, hollow support post secured to the tractor at the forward end thereof at the centerline of the tractor. A vertically disposed, rotatable shaft is mounted in the support post and has an upper end positioned above the support post and a lower end positioned below the lower end of the support post. A first elongated link arm or rod has its forward end connected to the lower end of the shaft so that the first link arm may pivot with respect to the shaft about a horizontal axis and whereby horizontal movement of the first link arm will cause the shaft to rotate. A second elongated link arm has its forward end connected to the support post so that the second link arm may pivot with respect to the first support post about a horizontal axis and whereby the second link may swing horizontally with respect to the support post. The forward and rearward ends of the first and second link arms are horizontally offset from one another so as to define a parallel arm linkage. A second support or bracket is pivotally secured to the rearward end of the first link arm about a vertical axis and has a follower operatively secured thereto for following a crop row or planter mark whereby lateral movement of the tractor with respect to the follower and the row or planter mark will cause the shaft to be rotated. A pointer element is secured to the upper end of the shaft for rotation therewith which is visible to the operator of the tractor and which indicates deflection or deviation of the centerline of the tractor with respect to the row or planter mark.

A principal object of this invention is to provide a device for indicating the position of a tractor with respect to a crop row or planter mark.

A further object of the invention is to provide a device for indicating the position of a tractor with respect to a crop row or planter mark which is clearly visible to the tractor operator without the tractor operator being required to turn his or her head.

Still another object of the invention is to provide a device for indicating the position of a tractor with respect to a crop row or planter mark which is entirely mechanical and which does not require any electronic components.

Still another object of the invention is to provide a device of the type described including means for raising the device out of ground engagement when the hitch of the tractor is raised.

Still another object of the invention is to provide a device for indicating the position of a tractor with respect to a crop row or planter mark including means for locking the follower thereof in an upper non-ground engaging position.

Still another object of the invention is to provide a device of the type described which is economical of manufacture and which is easily installed on a tractor.

Still another object of the invention is to provide a device for indicating the position of a tractor with respect to a crop row or planter mark which is durable in use.

These and other objects will be apparent to those skilled in the art.

DESCRIPTION OF THE PREFERRED EMBODIMENT

In the drawings, the numeral 10 refers to a conventional tractor having a forward end 12 and a rearward end 14. Tractor 10 includes a conventional hitch mechanism 16 which is vertically movable, as indicated by the dashed lines in FIG. 1. A conventional agricultural implement such as a planter or cultivator is conventionally attached to the hitch 16.

Figure 4:
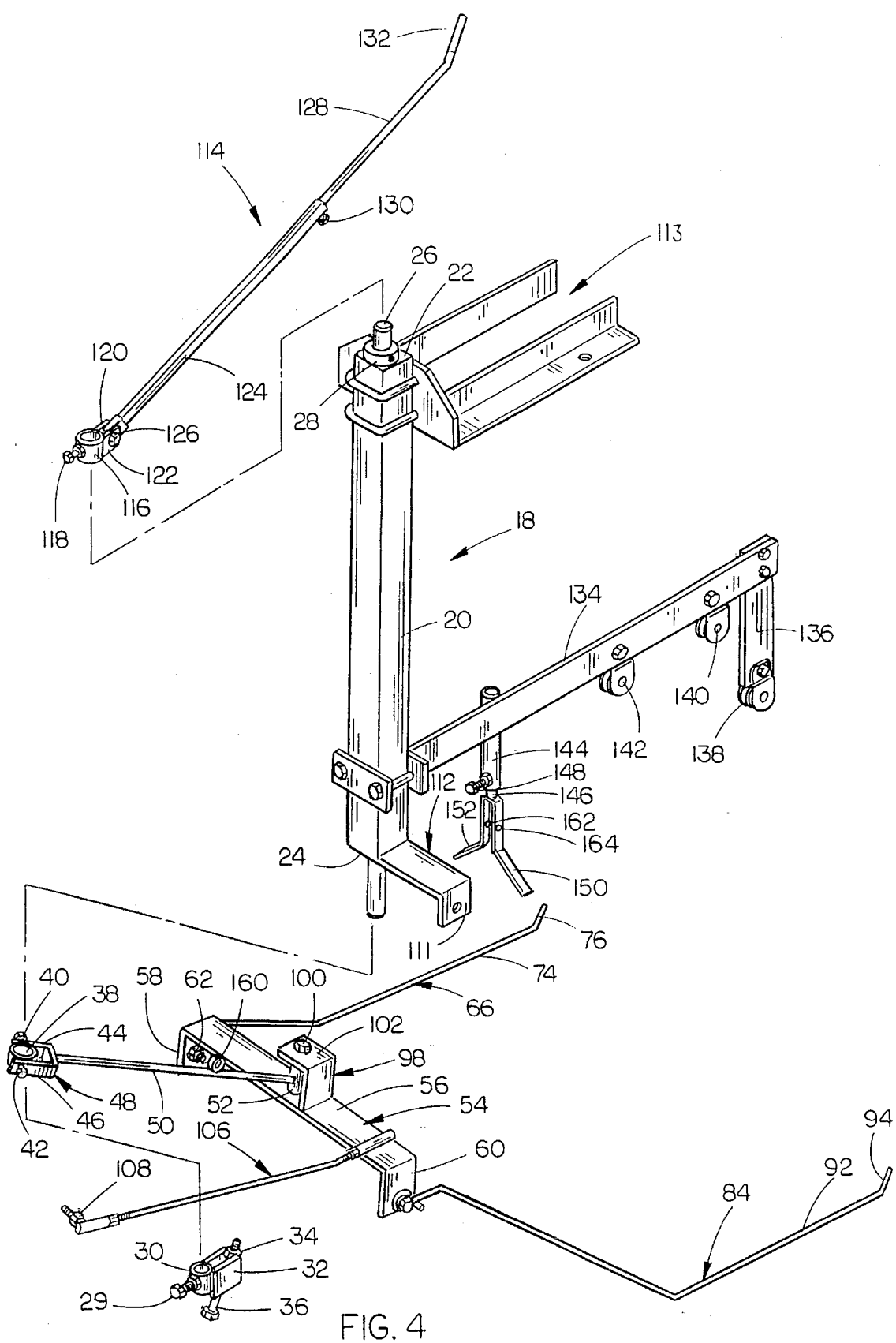
FIG. 4 is an exploded perspective view of the device of this invention.
Figure 7:
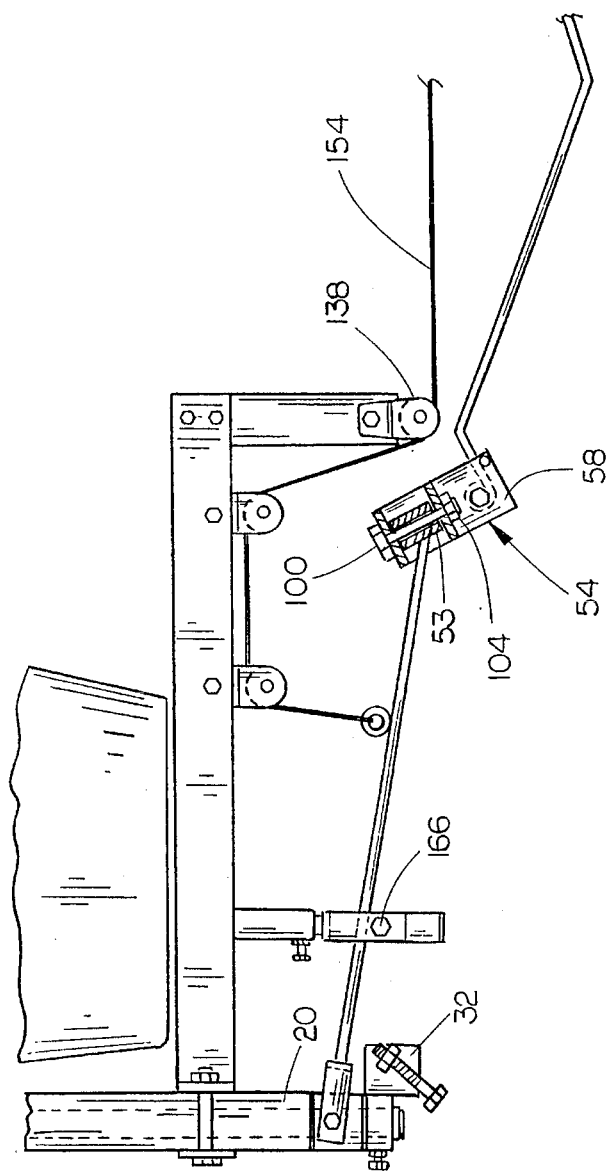
FIG. 7 is a partial side elevational view of the device of this invention with portions thereof cut away to more fully illustrate the invention.
Figure 6:
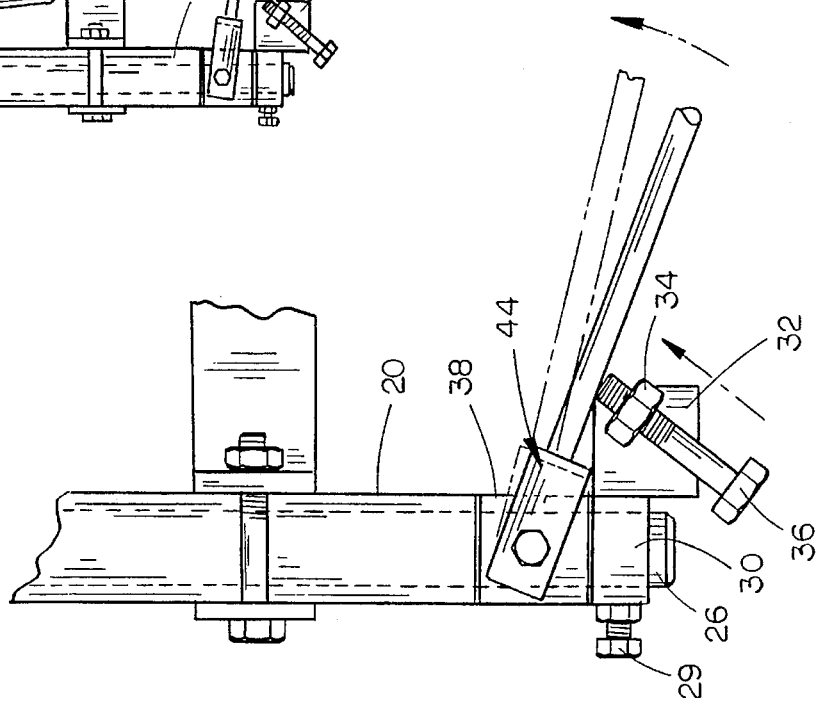
FIG. 6 is a partial side elevational view illustrating the means for limiting the downward movement of the follower.

The guidance or pointer mechanism of this invention is referred to generally by the reference numeral 18. Guidance mechanism 18 includes a vertically disposed support post 20 having an upper end 22 and a lower end 24. Support post 20 is hollow and has a shaft 26 rotatably mounted therein. Collar 28 is mounted on shaft 26 and secured thereto by bolt 29 below the upper end thereof, as illustrated in FIG. 4. As illustrated in FIG. 6, a collar 30 is mounted on shaft 26 above the lower end thereof and has a bracket 32 secured thereto to which is welded a nut 34 having an adjustment bolt 36 threadably received therein. In FIGS. 6 and 7, one side of the bracket 32 has been cut away to more clearly illustrate the bolt 36.

A collar 38 is positioned on shaft 26 above collar 30 and has a pair of bolts 40 and 42 threadably mounted thereon, the inner ends of which are in communication with the interior of collar 38. Bolts 40 and 42 also extend through legs 44 and 46 of U-shaped bracket 48, as illustrated in the drawings. The inner ends of the bolts 40 and 42 are in frictional engagement with shaft 26 so that collar 38 and U-shaped bracket 48 rotate with shaft 26 and vice versa. As seen in FIG. 6, U-shaped bracket 48 is pivotally mounted on the collar 38, about a horizontal axis, by means of the bolts 40 and 42 extending through the legs 44 and 46. An elongated shaft or rod 50 extends rearwardly from bracket 48 and has a stub shaft 52 secured to the rearward end thereof.

The numeral 54 refers to a support having a top portion 56 and downwardly extending legs 58 and 60 at the opposite ends thereof. Bolt 62 extends through eye portion 64 of wand 66. Bolt 62 also extends through leg 58 and is maintained therein by nut 68. Wand 66 also includes a forward portion 70, intermediate portion 72 which extends outwardly, downwardly and rearwardly from the rearward end of forward portion 70, intermediate portion 74 which extends rearwardly from the rearward end of intermediate portion 72, and rear portion 76. Stop pin 78 extends outwardly from leg 58 below forward portion 70 so as to be in the pivotal path of forward portion 70, for a purpose to be described in more detail hereinafter. Bolt 80 extends through eye portion 82 of wand 84 and is secured to leg 60 by nut 86. Wand 84 includes a forward end portion 88, intermediate portion 90 which extends outwardly, downwardly and rearwardly from the rearward end of forward portion 88, intermediate portion 92 which extends rearwardly from the rearward end of intermediate portion 90 and rear portion 94. Stop pin 96 extends outwardly from leg 60 below forward end portion 88 so as to be in the pivotal path thereof, for a purpose to be described in more detail hereinafter. For purposes of description, wands 66 and 84 define a follower. An inverted L-shaped bracket 98 is secured to support 54 as illustrated in FIG. 4. Bolt 100 extends through the top wall 102 of bracket 98 and extends through stub shaft or collar 52 to rotatably mount stub shaft 52 on bolt 100. Bolt 100 extends through top wall 56 of support 54 and is secured thereto by means of nut 104. A portion of bracket 98 and support 54 have been cut away in FIG. 7 to illustrate the relationship of the bolt 100, stub shaft 52 and support 54.

The numeral 106 refers to a length adjustable rod having a conventional swivel connection 108 at its forward end and a conventional swivel connection 110 at its rearward end. Swivel connection 110 is bolted to top wall 56 of support 54 in a laterally spaced relationship to bolt 100. Swivel connection 108 is secured to the outer end 111 of arm 112 which extends outwardly from the side of support post 20. The rod 50 and the length adjustable rod 106 form a parallel arm connection between support 54 and shaft 26 and post 20. The parallel arm arrangement just described ensures that the longitudinal axis of top wall 56 will remain substantially transverse to the direction of movement of the tractor as the wands or follower cause the shaft 26 to be rotated in post 20 as the tractor moves out of alignment with a crop row or a planter mark, as will be described in more detail hereinafter.

Post 20 is secured to the forward end of tractor 10 by means of the bracket assembly 113 or any other convenient attachment method.

The numeral 114 refers to a pointer assembly including a collar 116 which is mounted on the upper end of shaft 26 and secured thereto by means of bolt 118. A pair of rearwardly extending tabs 120 and 122 are secured to collar 116 and receive the forward end of tube 124 as illustrated in FIG. 4. Tube 124 is selectively pivotally secured to the tabs 120 and 122 by means of the bolt assembly 126. Rod 128 has its forward end received in the rearward end of tube 124 and is secured therein by means of bolt 130. Preferably, the rearward end of the rod 128 is provided with an upwardly extending portion 132 so that the tractor operator will be able to easily focus on the rearward end portion 132 of the pointer 114.

Figure 5:
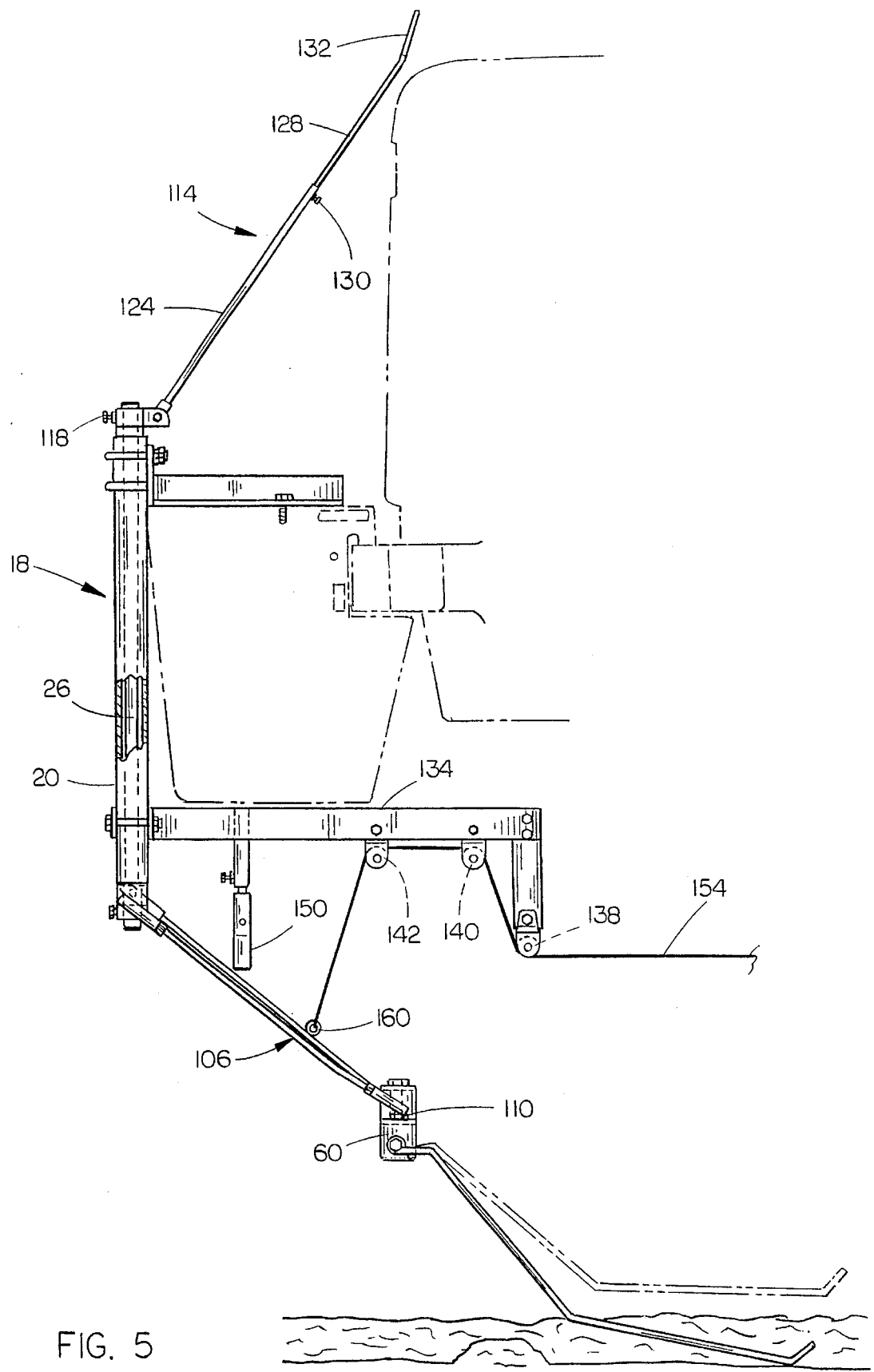
FIG. 5 is a side elevational view of the indicator device of this invention.

It is preferred that the guidance or pointer mechanism of this invention include some means to raise the wands or follower upwardly out of ground engagement to enable the tractor to be turned around in the field without damaging the wand or follower. To this end, an arm in the form of a bar or the like is secured to post 20 adjacent the lower end thereof and extends rearwardly therefrom, as seen in FIG. 4. A downwardly extending bar 136 is secured to the rearward end of bar 134 and has a rotatable pulley 138 mounted thereon. Pulleys 140 and 142 are also secured to the underside of bar 134, as best seen in FIG. 4. Tube 144 is secured to one side of bar 134, as seen in FIG. 4, by welding or the like and vertically adjustably receives shaft or rod 146 therein which is maintained therein by means of bolt 148. A pair of spaced-apart guide members 150 and 152 are secured to the lower end of the shaft 146 and are adapted to receive the rod 50 therein when the support 54 is raised upwardly with respect to shaft 26 when the tractor hitch is raised. Cable 154 is secured to hitch 16 at 156, as seen in FIG. 1. Cable 154 extends forwardly from connection 156 and passes beneath a pulley 158. Cable 154 then extends beneath and around pulley 138, as seen in FIG. 5. Cable 154 then extends over pulleys 140 and 142, as also illustrated in FIG. 5. The forward end of cable 154 is secured to eyelet 160 mounted on rod 50. As seen by the broken lines in FIG. 1, vertical movement of the hitch 16 by the tractor operator, such as would occur when the tractor is being turned around at the end of a row or the like, causes the rod 50, support 54 and the wands 66 and 84 to be raised upwardly out of ground engagement so that the wands will not be damaged during the turning operation. When the rod 50 is moved upwardly by the cable 154, rod 50 is received between the guides 150 and 152 to prevent the guidance assembly from swinging back and forth in a sideways direction.

Figure 2:
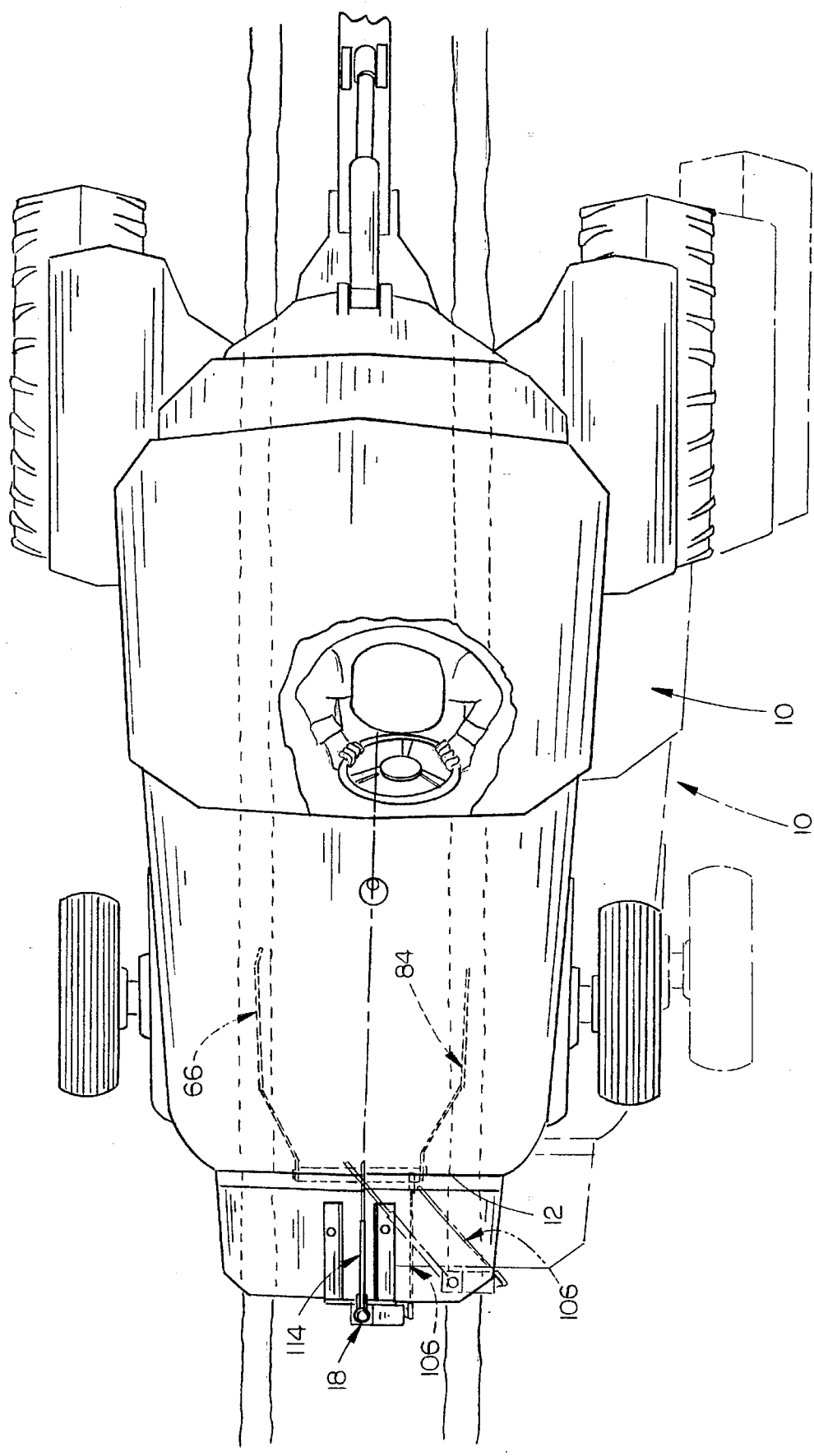
FIG. 2 is a top view of the tractor and device of this invention with the broken lines illustrating the position of the tractor when it has deviated to the left of a row or planter mark.
Figure 3:
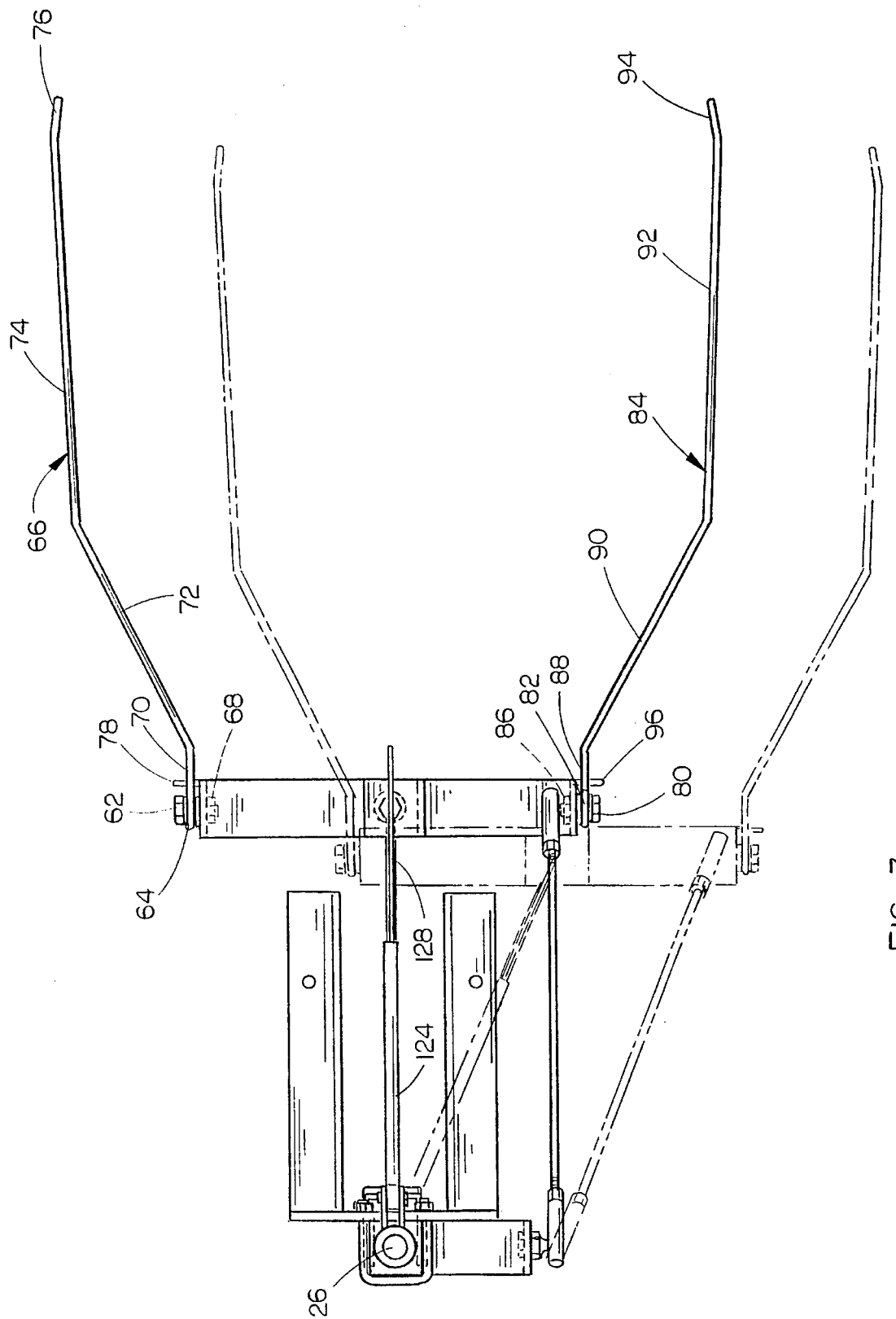
FIG. 3 is a top view of the device of this invention with the broken lines indicating the manner in which the follower may pivot with respect to the supporting structure.

In operation, the guidance-pointer apparatus of this invention is mounted on the tractor as previously described. The support post 20 is positioned with respect to the tractor canterline so that the rearward end portion 132 of the pointer 114 is aligned with the centerline of the tractor and is clearly visible to the tractor operator, as viewed in FIG. 1. The tractor operator, with the hitch 16 in a raised position, then maneuvers the tractor so that it is properly aligned with a crop row or planter mark. In such a position, the wands 66 and 84 (follower) will be in proper engagement with the row or planter mark. Such a position is illustrated by solid lines in FIG. 3. If the tractor operator should inadvertently permit the tractor to move to the left with respect to the planter mark or row, as illustrated by dashed lines in FIG. 2, the wands 66 and 84 will remain in position with respect to the row being followed or the planter mark, but the parallel arms or rods 50 and 106 will be angled, as illustrated by broken lines in FIG. 2, which causes the shaft 26 to be rotated in a counterclockwise direction with the pointer 114 also being moved to the right or counterclockwise, as viewed in FIG. 2. The operator then sees that the pointer is to the right of the centerline of the tractor which indicates to the operator that he must steer the tractor to the right until the pointer 114 is again aligned with the centerline of the tractor. Conversely, if the tractor operator should permit the tractor to drift to the right with respect to the row or planter mark being followed, the pointer 114 will be moved or rotated in a clockwise direction, thereby causing the rearward end portion 132 of pointer 114 to be positioned to the left of the centerline of the tractor which indicates to the operator that he must steer his tractor to the left to again properly maneuver the cultivator or the like which the tractor is pulling to be properly aligned with the rows.

When the operator reaches the end of a row and wishes to turn around, the cultivator or implement must also be raised. The raising of the cultivator or implement by the hitch 16 causes the rod 50, support 54 and wands 66 and 84 to be moved upwardly so that the wands are not in ground engagement and will not be damaged during the turning operation. With the wands being raised, lateral movement of the same is prevented since the rod 50 is received between the guides 150 and 152. If it is desired to lock the guidance mechanism in its upper position, rod 50 is positioned above the openings 162 and 164 with a bolt or pin 166 being inserted through the openings 162 and 164, as illustrated in FIG. 7.

Thus, the tractor driver or operator may precisely steer the tractor, aligning it directly within the center of the row or planter mark, by correcting the steering towards deflections indicated by a completely mechanically linked pointer. The pointer, being situated directly in front of the centerline of the tractor hood, allows the driver to steer while keeping his/her vision focused ahead of the tractor and down the row, thereby eliminating the constant need to adjust his/her focus from far to near. Tests have revealed that a significant reduction in driver fatigue occurs, thereby greatly increasing steering precision in both daylight and at night. Further, a much reduced crop loss is present due to inaccurate cultivation which would otherwise have occurred.

If desired, wands 66 and 84 could be replaced by a pear or heart-shaped weight (follower) which would be dragged along the row and which would be connected to the support 54. The pear or heart-shaped dragging or following devices are commonly used in other types of guidance systems.

Thus it can be seen that the invention accomplishes at least all of its stated objectives.

I claim:

1. A combination tractor and pointer mechanism, wherein the tractor has a forward end, a rearward end, an operator's station, and a hitch at the rearward end of the tractor for connection to an agricultural implement, comprising:

a first support secured to said tractor at the forward end thereof;

a vertically disposed, rotatable shaft mounted on said first support and having an upper end and a lower end;

a first elongated link arm having rearward and forward ends;

means connecting said forward end of said first link arm to said shaft wherein said first link arm is pivotal with respect to said shaft about a first horizontal axis and wherein horizontal movement of said first link arm will cause said shaft to rotate;

a second elongated link arm having rearward and forward ends;

means connecting said forward end of said second link arm to said first support wherein said second link arm is pivoted with respect to said first support about a second horizontal axis and wherein said second link arm is horizontally swingable with respect to said first support;

said forward end of said second link arm being horizontally offset from said forward end of said first link arm;

said first and second link arms each having a longitudinal axis which are generally parallel to one another;

a second support pivotally secured to said rearward end of said first link arm about a first vertical axis;

said rearward end of said second link arm being pivotally secured to said second support about a second vertical axis;

a follower secured to said second support for following a row or planter mark wherein lateral movement of said tractor with respect to said follower will cause said shaft to be rotated;

said rearward end of said second link arm being horizontally offset from said rearward end of said first link arm so that the longitudinal axes of said first and second link arms are generally parallel;

and a pointer element secured to said upper end of said shaft for rotation therewith, said pointer element being visible to an operator of said tractor when the operator is in the operator's station.

2. The combination of claim 1 wherein said follower comprises a pair of horizontally spaced-apart and rearwardly extending ground engaging wands.

3. The combination of claim 1 wherein said hitch on said tractor is selectively vertically movable and further comprising interconnections means for interconnecting said second support and said hitch so that said second support is raised upwardly when said hitch is raised upwardly and said second support is lowered when said hitch is lowered.

4. The combination of claim 1 wherein said second support comprises a bracket including an elongated top wall having end walls extending downwardly therefrom at the opposite ends thereof, said top wall having a longitudinal axis which is disposed transversely with respect to the direction of travel of said tractor; said follower comprising a first elongated wand pivotally secured about a third horizontal axis, to one of said end walls, and a second elongated wand pivotally secured, about a fourth horizontal axis, to the other of said end walls.

5. The combination of claim 4 wherein each of said wands extends rearwardly, outwardly and downwardly from its associated end wall.

6. The combination of claim 4 wherein each of said end walls has a stop mounted thereon which is in the pivotal path of the said wand mounted thereon to limit downward pivotal movement of each wand relative to its respective end wall.

7. The combination of claim 1 wherein said follower is selectively vertically movable between a lower ground engaging position and an upper stowed position.

8. The combination of claim 7 further including means for preventing sideways movement of said follower when said follower is in its said stowed position.

* * * * *